United States Patent [19]

Fazzolare et al.

[11] Patent Number: 4,873,093
[45] Date of Patent: Oct. 10, 1989

[54] STARCH SNACK FOODS AND PROCESS

[75] Inventors: Richard D. Fazzolare, Pearl River, N.Y.; Joseph A. Szwerc, Mahwah; Rich McFeaters, Hackensack, both of N.J.

[73] Assignee: Nabisco Brands, Inc., Parsippany, N.J.

[21] Appl. No.: 772,918

[22] Filed: Sep. 5, 1985

Related U.S. Application Data

[63] Continuation-in-part of Ser. No. 681,647, Dec. 14, 1984, abandoned.

[51] Int. Cl.$^4$ ............................ A21D 8/06; A23P 1/08
[52] U.S. Cl. ........................................ 426/28; 426/302; 426/502; 426/549; 426/550; 426/559; 426/808
[58] Field of Search ................... 426/549, 559, 20-21, 426/28, 508, 808, 550, 302, 502

[56] References Cited

U.S. PATENT DOCUMENTS

| | | | |
|---|---|---|---|
| 678,749 | 7/1901 | Moore et al. | 426/28 |
| 1,039,912 | 10/1912 | Dollings . | |
| 2,505,407 | 4/1950 | Johnson . | |
| 3,348,950 | 10/1967 | Weiss . | |
| 3,451,822 | 6/1969 | Fast et al. . | |
| 3,600,193 | 8/1971 | Glabe . | |
| 3,615,697 | 10/1971 | Hollenbeck | 426/18 |
| 3,698,914 | 10/1972 | Kortschot et al. . | |
| 3,698,915 | 10/1972 | Glasgow . | |
| 3,753,729 | 8/1973 | Harms et al. . | |
| 3,800,050 | 3/1974 | Popel | 426/343 |
| 3,922,370 | 11/1975 | Prakash | 426/559 |
| 3,925,567 | 12/1975 | Abe | 426/559 |
| 3,937,848 | 2/1976 | Campbell et al. | 426/439 |
| 3,982,032 | 9/1976 | Koizumi | 426/296 |
| 4,208,476 | 6/1980 | Tsao | 426/549 |
| 4,312,892 | 1/1982 | Rubio | 426/626 |
| 4,418,088 | 11/1983 | Cantenot | 426/549 |
| 4,455,321 | 6/1984 | Glabe | 426/549 |
| 4,505,942 | 3/1985 | Ito et al. | 426/551 |
| 4,572,493 | 6/1988 | Moriki | 426/559 |
| 4,609,557 | 9/1986 | Mao et al. | 426/549 |

FOREIGN PATENT DOCUMENTS

| | | |
|---|---|---|
| 2267049 | 11/1975 | France . |
| 54-032056 | 10/1979 | Japan . |
| 55-108250 | 8/1980 | Japan . |

OTHER PUBLICATIONS

Pyler, E. J., "Baking Science and Technology", Siebel Publ. Co., Chicago, Ill., 1973, pp. 242-244 and 428-429.
Matz, Samuel, Cookie & Cracker Technology, The AVI Publishing Co., Inc., Westport, Conn., pp. 238-253, (1968).
Tressler, Donald K., Ph.D., Food Products Formulary, vol. 2, Cereals, Baked Goods, Dairy and Egg Products, The AVI Publishing Co., Inc., Westport, Conn., pp. 103-104, (1975).
Morris, C. E., Engineering Foods, "Low-Calorie, Baked Snack . . . 'Potato Pips'", p. 58, (8/8/84).

Primary Examiner—Donald E. Czaja
Assistant Examiner—Mary S. Mims
Attorney, Agent, or Firm—Richard Kornutik

[57] ABSTRACT

The invention is a process and a product of the process for preparing a baked snack food from a composition containing at least one ingredient having starch. The ingredient having starch and the water comprises substantially all of the ingredient of the composition. The method involves steaming the composition to form a dough-like consistency. In the most preferred embodiments of the invention the ingredient including starch is either a corn or a potato ingredient. The steaming is conducted until the composition obtains a temperature of at least 160° F. and preferably 200° F. The composition is held at this temperature for about 2 to about 6 minutes. The composition is then machined, formed into pieces, and baked in a conventional oven. During baking the exterior layer of the dough cooks rapidly and traps steam in the interior portion of the dough. Blisters and curls result in the final product that impart a chip-like appearance to the final product. An alternative embodiment includes applying a spray oil to the pieces before baking to obtain a final product having a flat cracker-like appearance.

10 Claims, No Drawings

STARCH SNACK FOODS AND PROCESS

This invention is a continuation-in-part of U.S. patent application Ser. No. 681,647, filed Dec. 14, 1984, abandoned.

BACKGROUND OF THE INVENTION

1. Field Of The Invention:

The invention relates to a product and a process for preparing bakery snacks. In particular this invention relates to a product and a process for preparing a baked snack food from gelatinized starch ingredients.

2. Description Of The Prior Art

Snack items include a wide variety of foods including potato chips, corn chips, puffed dough articles, cookies, and crackers. Processed snack foods are generally provided to the consumer in a ready-to-eat form. Food snacks are generally eaten separately from regular meals or used to supplement a meal.

Snack foods include chip products and crackers. Chip products are frequently made from wheat or other starch-containing ingredients that are deep fat fried examples of chip products include corn chips and potato chips. Crackers are usually baked products and have a high content of wheat or other gluten containing and non-gluten flour that can form a dough. Cracker dough is machined during its processing and baked dry or to a water content, that provides the final chip product with a crispy texture.

The ingredients used to make corn chips or potato chips have little or no gluten and consist essentially of starch. A hydrated starch or gelatinous composition without gluten typically does not form a machinable dough. For this reason starchy materials such as corn, flour, or potato flour are not used to make crackers. The dough used to make crackers must have enough strength that it can be stretched during machining and laminating. Typically, starchy materials such as corn flour and potato flour when mixed with water do not form a dough that is "workable" or machinable. Most snack foods produced from starchy materials must be extruded to form a final product or mixed with a gluten-containing flour to form a dough that can be machined and baked into a final product.

Most baked snack products which are made from a starchy materials are prepared initially by forming a composition from water and starch flour. Seasonings and flavorings can be added to the composition. The dough composition is then extruded. The extruded composition is cut and dropped onto a belt or tray and transported to an oven for baking. After baking, the snack food is further dried or cooked to allow for the extraction of as much moisture as possible. The extruded or otherwise shaped starch composition can alternatively be deep fried instead of baked to make the final product crispy. There are many other variations on this basic procedure and compositions used.

U.S. Pat. No. 4,528,202 to Wang et al. discloses a process for making shredded potato products. The invention of this patent forms a potato starch and water dough mass which is then tempered to obtain an even water distribution. The dough mass is then shredded and the resulting shredded dough pieces are baked. This patent does not disclose a method wherein a dough is produced from potato starch that can be machined according to the practice in cracker technology.

U.S. Pat. No. 4,455,321 to Glabe discloses a snack food prepared from an extrudable mixture of dehydrated potato flour, baking powder, mono and diglycerides of fatty acids, and water. This mixture is formed into a dough, extruded, and cut. The cut dough pieces are then baked. This patent discloses a process for producing a starchy dough product which is a shaped, hollow potato snack. The process does not involve machining a workable dough in a fashion similar to that used in cracker technology.

U.S. Pat. No. 3,600,193 to Glabe discloses a process for preparing a snack food product that includes the steps of mixing ungelatinized corn flour and gelatinized corn flour together with seasonings such as tapioca starch, milk solids, sodium chloride, starch phosphate, and other flavoring materials. These ingredients are mixed to form a dough and then extruded. The extruded dough is shaped as desired and cut into pieces. The cut dough pieces are steamed at between 190° F. and 210° F. The steamed dough is dried and deep fat fried in vegetable oil at a temperature between 390° F. and 400° F. This process involves the step of extruding the dough before steaming. The product of this process is not a baked snack food.

U.S. Pat. No. 3,922,370 to Prakash discloses a process for producing a snack product from a dough formed by mixing together water and a dry mix of ungelatinized rice, rice flour, modified starch, and flavorings. The dough is shaped into separate pieces and steamed at a temperature between 95° C. and 100° C. The steaming of the dough gelatinizes the starch contained in the dough. The steamed product is dried in two successive steps. The product is then deep fat fried at between 180° C. and 230° C. for 4 to 14 seconds to yield a rice snack. The product of this process is not a baked snack food.

U.S. Pat. No. 3,348,950 to Weiss discloses a process for making a snack food product by first mixing together corn, sucrose, water, and flavor developing ingredients. This mixture is combined with a second mixture of yellow corn grits, water, and sodium bicarbonate. The combined mixture is precooked under pressure at temperatures between 247° F. and 259° F. and at a pressure of 14 to 20 pounds per square inch. The gelatinized dough is shaped and dried. Dough pieces are formed and deep fat fried. This process does not produce a baked snack food and involves a steaming process utilizing costly control devices to maintain the specified pressures.

U.S. Pat. No. 1,039,912 to Dollings discloses a granular food product made of a wheat flour dough. The dough is successively boiled, baked, dried, and granulated. The formulas disclosed for this snack food can include limited quantities of corn flour. The dough disclosed by this patent is difficult to form into a desirable shape and generally requires gluten containing wheat flour to provide strength to the dough.

In U.S. Pat. No. 2,505,407 to Johnson discloses a process for making rye products that comprises forming a batter primarily of rye flour, extruding the batter to form dough pieces, baking the extruded dough pieces, and dehydrating the dough pieces to a desired degree of crispness. The product of this patent is concerned with an extruded snack product and not a baked snack food.

U.S. Pat. No. 3,753,729 to Harms et al. discloses a process for preparing a food snack from a corn starch material in combination with an oleaginous material and water. This mixture is extruded under pressure at 350 to 500 pounds per square inch at temperatures above 100°

C. to form a "puffed" ready-to-eat product. This process does not apply steam directly to the dough and requires specific abrasion characteristics for the starch material to form the dough. This process does not produce a baked snack food.

U.S. Pat. No. 4,418,088 to Cantenot discloses a process wherein roasted corn flour, wheat flour, sugar, and salt are mixed together. The mixture is shaped, extruded, and baked between 140° C. and 155° C. It is then cooled immediately and toasted. This process does not produce a baked snack food.

The products and procedures for making the snack foods described above, indicate that the industry lacks a product or a process for making starchy ingredients into a workable or machinable dough-like composition that can be machined and processed according to cracker technology to produce a baked, chip-like snack food.

SUMMARY OF THE INVENTION

The process of this invention comprises the steps of mixing at least one ingredient having starch with water to form a composition. Steaming of the composition then is performed with continued mixing for a sufficient amount of time to form a machinable dough-like consistency. The dough-like composition is machined by any of a number of conventional means including those means used in cracker technology. During machining, pieces are formed. Baking of the pieces is then conducted.

The starch component of this invention can include any ingredient having starch such as any commercially available dried potato product including potato flour and potato flakes, corn flour, corn meal, buckwheat flour, rice flour, barley flour, tapioca, and mixtures of these. Alternative embodiments of the starch component can include a gluten-containing starch ingredients such as wheat flour, rye flour, sorghum flour, graham flour, and mixtures of these.

The machining processes used in this invention can include cracker machining which involves laminating, reduction rolling, and cutting and tortilla machining. The baking used in this invention is usually performed with convection heating, however, dielectric energy applications can be used as a post-baking process to further the drying of the product.

An embodiment of the method of this invention uses starch ingredients that are mixtures of a nongluten-containing ingredient and a wheat or gluten-containing flour. The starch ingredient is mixed with water and other ingredients and directly exposed to steam at a temperature of at least 160° F. at atmospheric pressure. The resulting dough-like composition in the preferred embodiment is then machined and formed into a sheet having three, one-fourth inch laminae. The laminated sheet is passed through two reduction rollers to obtain a sheet of approximately 1/32 inch in thickness. This sheet is cut into pieces and can be sprayed with vegetable oils to affect its final texture. A post-bake spray oil application is optional and included in the preferred embodiment. The product is then baked in a conventional oven. The preferred embodiment of the invention produces a thin, crisp snack food in which the dough laminae are partially separated during baking and form "blister like" formations. An alternative embodiment produces a flat unblistered snack food product. This product is a baked snack food product that can have the appearance of a "chip" product such as a potato chip. The method of this invention includes alternative embodiments for making starch snack foods in which water is added during the steaming process to provide hydration of the starch containing ingredient.

An alternative embodiment of this invention includes diastatic barley malt flour in a composition including an ingredient having starch. The composition is mixed with hot water to obtain a dough temperature of between about 95° F. and about 105° F. This temperature is maintained for about 30 minutes to allow for enzymatic activity to occur. Steaming, machining, and baking then occur as detailed above.

DETAILED DESCRIPTION OF THE INVENTION

The gelatinized starch snack foods of this invention are prepared from conventional starchy materials or ingredients having starch. The preferred embodiment is made of mixture of potato flour and potato flakes. Desirable alternative embodiments can be made from potato flour, potato flakes, corn flour, and corn meal, and other ingredients either used separately or in various combinations. Each of these ingredients has a high starch content, but is absent of gluten. When mixed with water these ingredients have no elasticity because of their lack of gluten. The inability to stretch makes the wet compositions prepared from these ingredients unsuitable for conventional handling and machining as used in cracker technology.

Other starch-containing ingredients can be used in alternative embodiments of this invention. Examples of other non-gluten, starch-containing ingredients include buckwheat flour, rice flour, barley flour, tapioca, and mixtures of these. Non-gluten, starch-containing ingredients can also be blended with gluten-containing ingredients to vary the flavor and/or texture of the final product.

Corn germ can be added to the dough composition in small quantities to modify the flavor and texture of the final product. Corn germ is a by-product of milling corn and gives a starchy snack food product a sweet flavor and crunchy texture. Corn germ added in an amount up to 20 percent by weight of the total ingredients having starch can be used to enhance the flavor of the final product.

Vegetable shortening or oil can also be present preferably in an amount less than 10 percent of the finished product. Usually less than 2 percent of the oil used in this process is mixed into the snack food ingredients. The remainder of the oil is applied topically to the machined and cut pieces before baking or to the final product after baking. Vegetable shortening and oil are used to affect flavor and texture modifications of the final product. The vegetable shortening or oil mixed into the composition is preferably added to the dough-like composition resulting after steaming.

Other ingredients, not containing starch, are used to make snack foods according to this invention. Salt can be present in amounts between about 1 to about 2 percent of the total starch flour composition. Sugar can be added to sweeten the final product in an amount of about 2 to 3 percent of the total starch flour composition. Leavening agents are not required, but small amounts of yeast products can be added to flavor a product.

Flavoring ingredients are an important consideration in making any snack product and can vary widely. More common flavoring ingredients include onion, garlic, bacon, chicken, beef, cheese, ham, peanut butter, nuts and seeds, vanilla, chocolate products, spices, and others. These flavoring ingredients can be blended into the composition or sprinkled upon the dough-like composition before or after baking. Blends of flavoring ingredients can be used as toppings or "sandwich filling" materials used with the product of this invention.

In preparing the composition including an ingredient having starch all dry and minor ingredients are blended together. Certain minor ingredients such as salt or sodium bicarbonate can be dissolved before being mixed into the composition of ingredients. The one or more ingredients having starch are blended with a sufficient amount of water to form a wet starchy mass or composition. In forming this composition a vegetable oil shortening, such as soybean oil, is also used. The starch ingredients, water, and minor ingredients are mixed until a wet starchy mass or composition is obtained. This composition has a nonelastic consistency similar to mashed potatoes. This composition is then subjected to steaming. Shortening is added after the steaming process is completed. Mixing is continued to assure uniform incorporation of the ingredients into the dough. After sufficient steaming the composition forms a "dough-like" consistency. This dough-like consistency is comparable to the elastic, machinable doughs that can be formed from gluten-containing ingredients such as wheat flour.

The reasons that the "starch components" or ingredients having starch develop this dough-like consistency upon steaming are not well understood. Certain ingredients having starch such as corn flour and corn meal contain ungelatinized starch that is gelatinized upon steaming. With these ingredients the formation of gelatinized starch is believed to be at least partially responsible for the formation of the dough-like consistency of the steamed, starch components. Other ingredients such as potato flour and potato flakes contain starch that is substantially, completely pregelatinized. With these starch components the degree of cell rupturing causing the release of hydrated, gelatinized starch affects the formation of the dough-like consistency of the steamed composition. The released, gelatinized starch molecules interact with one another to impart a dough-like consistency to the composition.

The degree of dough-like consistency in a steamed composition can be determined by a Voland Texturemeter. This device measures compressability or resistance to force of compositions in units defined by the Leatherhead Food Research Associations. These units are termed "LFRA". A high LFRA is produced by a dry and hard composition and a low LFRA is produced by a fluid and soft composition. Desirable dough-like compositions using potato ingredients have LFRA measurements between about 150 and about 250 with an LFRA of 200 being the most desirable. Other ingredients having starch can vary in the desirable ranges for LFRA.

Desirable LFRA measurements can be produced with steamed compositions, wherein the ingredient having starch is a potato ingredient, when there is between about 10 and 75 percent cell rupture of the potato ingredient. The most desirable LFRA measurements are obtained with potato ingredients having between about 25 and about 75 percent cell rupture upon steaming. Other ingredients vary in their relationship between desirable LFRA measurements and the degree of cell rupturing. Additionally, cell rupturing is not the only factor affecting the development of a dough-like consistency in the steamed compositions of this invention.

The dough-like composition is desirably subjected to steam supplied at a temperature of about 212° F. at, for example, a supply pressure of about 40 to about 45 pounds per square inch. Superheated steam at temperatures above 212° F. can be effective for use in this invention as well as lower steam supply pressures. The steaming temperatures and pressures can vary depending on the equipment used. As the steam contacts the cold composition the steam condenses. The composition is heated to between approximately 160° F. and 212° F. At this temperature range the composition can still be powdery. Boiling water can be added to further assist the development of a dough-like consistency. During the steaming process continual mixing occurs. Upon obtaining the desired temperature of the composition steaming is ceased and the composition is mixed until it "tempers" or develops a homogeneous and lump-free dough-like mass.

The length of time to conduct the steaming process is dependent upon the volume capacity of the mixing vessel, the steam generator output, and the total amount of dough mixture present. Typically, 20 minutes is required to completely steam 170 pounds of flour at a supply pressure of 40 to 45 pounds per square inch. Steaming time can vary usually between 15 and 25 minutes because of variations in the temperature of the mixer and the ingredients used to form the composition. Regardless of the actual amount of time during which steaming is conducted, it is critical to obtain a dough mass temperature above about 160° F. and more desirably at least 190° F. This composition temperature is maintained for about 2 to about 6 minutes of tempering time. This is a sufficient amount of time at this temperature for the composition to develop a desirable dough-like consistency. In the preferred method of this invention the composition includes a potato ingredient having starch. This composition is steamed to about 200° F. and that temperature is maintained for 5 minutes to develop a dough-like consistency.

If too much water is added during the steaming process the resultant dough is too "tacky" and can not be machined. If too small an amount of water is added the dough remains too powdery and also can not be machined. Typically, the steaming process adds approximately 3 percent to the total water content of the dough.

In many starch snack foods water can be added during the steaming of the composition to simultaneously hydrate the starch and ensure complete gelatinization of the starch. The moisture from the steam is used to form a dough-like consistency from the ingredients forming the composition. With some ingredients having starch, this alternative method results in lumping and prevents the formation of a homogeneous composition having a dough-like consistency. Potato ingredients are examples of ingredients having starch that tend to lump in this alternative process.

The mixed, steamed dough-like composition is now ready for machining. The dough-like composition has a rubbery consistency and is semitransparent when sheeted. Various machining processes can be used. Machining can include the processes used in standard cracker technology. Alternative machining processes include the use of a tortilla machine in which the dough-like composition is rolled and formed into pieces without being laminated. A preferred machining process is outlined below.

The steamed dough-like composition is formed into a sheet and enters a dough laminating machine. The laminating operation can be performed by overlapping lamina of about one-fourth inch thickness each such that one sheet is placed upon another. Typically, between 3 to 6 laminae are layered together during this operation.

The laminated dough-like composition is then reduced in thickness. Reduction of the dough mass is performed in stages. For example, after the three laminae are formed into a sheet, the sheet is then compressed to about one-sixteenth inch. A final reduction in thickness is done by a gauge roller. The dough is reduced during this operation to a final thickness of about 1/32 of an inch.

The machined dough-like composition is then cut into dough pieces. Cutting can be performed by a reciprocating cutter, a rotary cutter, or other dough cutting mechanisms. The cut pieces in the preferred embodiment are circular in shape with a diameter of about one and three-quarter inches. Topping salt can be added at about 1 to 2 percent of the final product weight. Dockering or piercing the uncut sheet or cut pieces can optionally be included in the machining operation. Dockering decreases the occurrence of "checking" or the formation of undesirable stress lines that cause breakage in the final product. The cut pieces are then conveyed or transported to a convection oven for baking.

This invention requires a higher baking temperature than that of conventional dough. This is because conventional cracker dough has approximately a 40 percent total moisture content prior to baking as compared to approximately a 50 percent moisture content in the dough-like composition of this invention. The normal baking temperatures for conventional cracker dough of 425° F. to 450° F. for 4 minutes is not enough to fully dry the pieces of this invention without first burning the exterior of the pieces. This invention requires a higher temperature of between about 600° F. to about 650° F. for a total baking time of about 2 to 3 minutes. The fast application of the higher heats yields a rapid formation of steam within the pieces. Steam, present within the pieces, gives rise to blister formations as the pieces are being baked. This is due to the exterior portions of the pieces drying and trapping steam formed in the internal portion of the pieces. As the steam forms under the external layer, it performs a function similar to a leavening agent and causes expansion of the dough-like composition. Irregular, curled configurations of a piece can occur. In the preferred embodiment, which uses circular or disc shaped pieces, the final product has a "blistered cracker" appearance.

An alternative embodiment occurs when an application of spray oil is applied to the piece before baking. During baking, the oil prevents the exterior layer of the piece from drying completely before the moisture in the interior of the piece is released. As a result the piece remains flat. The initial application of oil allows for the uniform drying of the entire dough piece during baking. This product has a potato chip-like appearance.

After conventional baking, the dough pieces can be further dried by a dielectric energy application which disperses the moisture present within the piece and decreases its total moisture. The application of dielectric energy can also be useful in reducing checking, which as stated above is the formation of stress lines caused by uneven concentrations of moisture in the internal portion of the piece after baking. Additionally, drying after baking can be performed by the application of low heat and forced air around the pieces. After baking and drying it is beneficial to spray the pieces with oil. This provides for a more palatable product.

The moisture concentration after baking of the piece is important to the product of this invention. Typically, after the final drying step, a wheat cracker contains approximately 1.5 to 3.5 percent total moisture. The snack foods of this invention, because of their high starch concentration, are not crisp at the final higher moisture contents acceptable for some crackers. For products according to this invention an acceptable total moisture content after baking and drying is between 0.5 and 6.0 percent by weight. This moisture content must be kept low throughout the handling and shipping of this product. Packaging of this product is best accomplished in a vapor proof material.

Other alternative embodiments of this invention can include the use of potato flour made from unpeeled potatoes. By leaving the potato skin on the potatoes in preparing the flour, an "earthy" flavor can be obtained for the final product. Additionally, potato pieces or potato flakes can be used to slightly vary the final texture of the product.

When using corn flour in this invention, the corn flavor can be enhanced by including masa corn flour, corn germ, or corn grits. These ingredients are particularly desirable when oil is applied to the pieces prior to baking. The final product has the taste of a baked tortilla or taco shell and has a similar texture. It is also useful when using a corn blend for the dough-like composition to include approximately 1 percent sugar to compensate for some of the bitterness present in corn ingredients.

The use of small particulate matter interspersed in the dough disrupts the homogeneous, amorphous structure of the corn composition described above. When masa corn, corn germ, or corn grits are used with corn flour the tortilla cracker looses its normal texture and instead of being hard, glassy, brittle, or dense, the final product is less dense and has more air pockets. This produces a softer product, but the product is more crunchy than when made of only a corn flour.

In the preferred embodiment of this invention more than one ingredient having starch is used to form the snack food composition. Potato flakes and potato flour are used in the preferred embodiment with tapioca starch. This mixture produces a final product having a desirable texture and flavor. This mixture also produced less problems with checking than did products produced from potato compositions not having an ungelatinized starch component or ingredient.

The following examples assist in the understanding of this invention, but are not intended to be limiting on this invention.

EXAMPLE I

This example produces a potato chip-like product. The ingredients and their weights are:

| INGREDIENTS | POUNDS | OUNCES |
|---|---|---|
| Potato flakes | 140 | 0 |
| Potato flour | 20 | 0 |
| Vegetable oil | 1 | 4 |
| Sugar, fine granulated | 2 | 8 |
| Salt | 0 | 12 |
| Sodium bicarbonate | 0 | 12 |

| INGREDIENTS | POUNDS | OUNCES |
|---|---|---|
| Water | 70 | 0 |

The dry ingredients including the potato flakes, potato flour, sugar, salt, and sodium bicarbonate are blended together in a mixer. Water is added to these ingredients with mixing. The resulting composition is subjected to steaming during mixing.

The composition is steamed at atmospheric pressure with simultaneous mixing. In this example the steam is applied to the dough through a 6 inlet manifold on the lower back quadrant of a conventional upright mixer at 212° F. and 45 pounds per square inch of supply pressure. The dough mass is steamed to a temperature of 195° F. and this temperature is maintained for 3 minutes. Shortening is added to the dough. Mixing is conducted at a higher speed than required to blend the dry ingredients and water. The higher speed is necessary to incorporate the shortening into the dough.

The dough-like composition is then machined. The composition is laminated into 3 laminae and reduced in thickness in 2 stages to a final thickness of 1/32 of an inch. The composition sheet is then cut into circular shaped pieces and salted. The cut pieces are then conveyed through a convection oven. The pieces are baked at 650° F. for 2 minutes. The product of this example has a blistered, curled, potato chip-like appearance.

Typical moisture and gelatinization data obtained during the use of the process and formula of this example is provided for illustrative purposes. Dry potato flakes average approximately 7 percent moisture. If the potato flakes are mixed with potato flour the moisture content of the mixture is about 7.5 percent. A typical dough-like composition made from the potato mixture contains about 37 percent moisture before steaming. A peak moisture content during steaming is about 40 percent. The heat of the composition drives off moisture such that the dough-like composition after steaming is about 38 percent moisture. At the temperatures and pressures of this example, 20 minutes of steaming is required to elevate the composition from room temperature to about 195° F.

EXAMPLE II

This example produces a high shortening or "poker-chip" product. The ingredients and their weights are:

| INGREDIENTS | POUNDS | OUNCES |
|---|---|---|
| Potato flakes | 140 | 0 |
| Potato flour | 20 | 0 |
| Vegetable oil | 3 | 8 |
| Sugar, fine granulated | 2 | 8 |
| Salt | 0 | 12 |
| Sodium bicarbonate | 0 | 12 |
| Water | 80 | 0 |

The same process as used in Example 1 is repeated for this example. The resulting product is a flat, brittle, or crunchy cracker snack.

EXAMPLE III

This example produces a corn flavored chip. The ingredients and their weights are:

| INGREDIENTS | POUNDS | OUNCES |
|---|---|---|
| Corn flour | 175 | 0 |
| Vegetable oil | 3 | 0 |
| Salt | 0 | 12 |
| Sugar | 5 | 0 |
| Sodium bicarbonate | 0 | 12 |
| Water (hot-180° F.) | 130 | 0 |

This example uses the same process as detailed in Example I.

Typical moisture data obtained during the use of the process in this example is provided for illustrative purposes. Dry corn flour averages approximately 10 percent moisture. The composition formed after adding water, is approximately 47 percent moisture. During steaming a peak moisture content of 52 percent is obtained and after steaming the heat drives off some moisture and a final moisture of the dough-like composition is about 50 percent.

EXAMPLE IV

This example produces a soft textured cracker by the use of enzymatic action. The ingredients and their weights are as follows:

| INGREDIENTS | POUNDS | OUNCES |
|---|---|---|
| Ground corn flour | 160 | 0 |
| Sugar | 2 | 8 |
| Barley malt flour | 1 | 0 |
| Salt | 0 | 12 |
| Sodium bicarbonate | 0 | 12 |
| Vegetable oil | 2 | 8 |
| Water (cold-60° F.) | 120 | 0 |

The dry ingredients including the corn flour sugar, barley malt flour, salt, and sodium bicarbonate are blended together in a mixer at low speed. Water is added with continued mixing for 2 minutes. Steam is applied until the composition obtains a temperature of 100° F.±5° F. This composition temperature is held for minutes. The barley malt flour is diastatic and produces an enzymatic action at this temperature range. The enzymatic action breaks down the starch contained in the flour composition. After the 30 minutes have passed, the composition is again steamed until the temperature of 190° F. is obtained. The shortening is added and this temperature is maintained for 3 minutes while conducting high speed mixing. The enzymes present in the barley malt flour are destroyed above 165° F. Enzymatic activity is eliminated at this temperature.

The product produced by this method is machined and baked in the same manner as that presented in Example 1. The final product produced has a softer texture with less crunch and "light bite". Cracker snacks made according to this example are fracturable and break apart much like a pretzel as compared to a cookie which crumbles.

EXAMPLE V

This example produces a chip product containing potato pieces. The ingredients and their weights are:

| INGREDIENTS | POUNDS | OUNCES |
|---|---|---|
| Potato flakes | 140 | 0 |
| Potato flour | 20 | 0 |
| Sugar | 1 | 4 |

-continued

| INGREDIENTS | POUNDS | OUNCES |
|---|---|---|
| Vegetable oil | 2 | 8 |
| Salt | 0 | 12 |
| Sodium bicarbonate | 0 | 12 |
| Potato pieces | 10 | 0 |
| Water (cold-60° F.) | 85 | 0 |

The dry ingredients are blended together in a mixer. Water is added with further mixing. The resulting composition is then steamed until a temperature of 190° F. is obtained. Shortening is added and the resultant dough-like composition is mixed at high speed for 5 minutes, while maintaining the temperature at 190° F. After this the potato pieces are added and mixing is continued for another minute. The dough-like composition is then machined and baked in the same manner as that of Example 1.

EXAMPLE VI

This example produces a corn chip with a crunchy texture. The ingredients and their weights are as follows:

| INGREDIENTS | POUNDS | OUNCES |
|---|---|---|
| Corn flour | 100 | 0 |
| Masa (coarse ground corn flour) | 50 | 0 |
| Toasted corn germ | 25 | 0 |
| Sugar | 1 | 8 |
| Shortening | 5 | 0 |
| Salt | 1 | 12 |
| Sodium bicarbonate | 1 | 12 |
| Water (hot-180° F.) | 140 | 0 |

The coarse ground corn flour and the toasted corn germ are blended together in a mixer with the other dry ingredients. Water is added and the composition is steamed to 190° F. The dough-like composition is further mixed for 5 to 7 minutes. Shortening is then added with further mixing for 5 additional minutes at high speed. The dough-like composition is then machined in the same manner as presented in Example 1. The resulting cracker is similar in bite and taste to a corn chip.

EXAMPLE VII

This example produces a potato chip-like product with an earthy flavor. The ingredients and their weights are as follows:

| INGREDIENTS | POUNDS | OUNCES |
|---|---|---|
| Potato flakes | 130 | 0 |
| Potato flour | 20 | 0 |
| High protein barley flour | 10 | 0 |
| Sugar | 2 | 8 |
| Shortening | 3 | 0 |
| Salt | 0 | 12 |
| Sodium bicarbonate | 0 | 12 |
| Water (cold-60° F.) | 80 | 0 |

The method to produce this chip is the same as identified in Example 4.

EXAMPLE VIII

This example produces a potato chip-like product and is the preferred embodiment of the invention. The ingredients and their weights are:

| INGREDIENTS | POUNDS | OUNCES |
|---|---|---|
| Potato Flakes | 110 | 0 |
| Potato Flour | 10 | 0 |
| Ungelatinized Tapioca Starch | 20 | 0 |
| Sugar | 3 | 8 |
| Salt | 0 | 12 |
| Soda | 0 | 12 |
| Vegetable Shortening | 1 | 0 |
| Lecithin | 0 | 4 |
| Water | | |
| -Added as Steam (260° F.) | 7 | 0 |
| -Added as Formula Water (Cold-70° F.) | 68 | 0 |

In this example the potato flakes, potato flour, tapioca starch, sugar, salt, and soda are mixed together for one minute at a low speed. The formula water is added with continued mixing at low speed. The steam is then injected into the mixer at 260° F. under 6 pounds per square inch of supply pressure. Steaming continues until the composition obtain a temperature of 200° F. At this temperature the steaming is discontinued, but mixing at low speed continues for 5 minutes as the composition tempers. The vegetable shortening and dissolved lecithin are then added to the composition with mixing at a high speed. The mixed composition is then machined and baked in the same manner as described in Example I except that the cut pieces are dockered with six holes.

This example produces a final product that has a potato chip appearance and flavor.

What is claimed is:

1. A method for making a baked-starch based chip-like snack food comprising:
    (a) mixing at least one ingredient having starch with water to form a non-elastic, starch-based composition, said at least one ingredient having starch comprising a member selected from the group consisting of potato, corn, buckwheat, rice, barley, tapioca, wheat, rye sorghum, and graham ingredients;
    (b) steaming said starch-based composition with continued mixing until a composition temperature of at least 160° F. is obtained for a sufficient amount of time for said composition to form a machinable dough-like consistency;
    (c) machining said dough-like composition whereby pieces are formed, said machining including:
        (i) laminating a sheet of said dough-like composition to obtain over lapping laminae of said sheet;
        (ii) rolling said dough-like the laminated composition in at least one reduction roller; and
        (iii) cutting said dough-like the rolled composition; and
    (d) baking said pieces to obtain a snack having a flat chip-like appearance or a partially delaminated, blistered chip-like appearance.

2. The method according to claim 1, wherein said ingredient having starch is a member selected from the group consisting of potato flour, potato flakes, corn flour, corn meal, buckwheat flour, rice flour, barley flour, tapioca, and mixtures of these.

3. The method according to claim 1, wherein said ingredient having starch is a gluten-containing ingredient.

4. The method according to claim 3, wherein said gluten-containing ingredient is a member selected from the group consisting of wheat flour, rye flour, sorgum flour, graham flour, and mixtures of these.

5. The method according to claim 1, wherein said steaming occurs in a mixer whereby steam is in direct contact with said ingredient having starch.

6. The method according to claim 1, wherein a composition temperature of at least 190° F. is obtained said composition temperature being held for at least 3 minutes.

7. The process of claim 1 wherein said machining further includes:

dockering said cut dough-like pieces rolled composition.

8. The method according to claim 1, wherein a spray oil is applied to said pieces prior to baking.

9. A method as claimed in claim 1 wherein said baked starch snack food is a baked potato chip and said at least one ingredient having starch comprises a potato ingredient.

10. A method as claimed in claim 1 wherein prior to said steaming, said composition is enzymatically treated.

* * * * *